United States Patent

Calfee

[15] 3,681,636

[45] *Aug. 1, 1972

[54] PHASE SEQUENCE SENSING CIRCUIT

[72] Inventor: Wendell Calfee, Lima, Ohio

[73] Assignee: Westinghouse Electric Corporation, Pittsburgh, Pa.

[ * ] Notice: The portion of the term of this patent subsequent to March 4, 1986, has been disclaimed.

[22] Filed: Aug. 14, 1969

[21] Appl. No.: 850,133

[52] U.S. Cl...................317/47, 307/127, 317/335 C

[51] Int. Cl...............................................H02h 3/26

[58] Field of Search.......317/47, 48, 33 SC; 307/127, 307/87; 324/86, 108

[56] References Cited

UNITED STATES PATENTS 3,364,363 1/1968 Iordandis....................317/47 X 3,431,467 3/1969 Calfee............................317/47

*Primary Examiner*—J. D. Miller

*Assistant Examiner*—Harvey Fendelman

*Attorney*—A. T. Stratton, F. P. Lyle and Gordon H. Telfer

[57] ABSTRACT

In a polyphase AC power system, application of power to a load only upon correct phase sequence is provided by a circuit including a semiconductor switch such as a thyristor for directly developing a signal for an electrically responsive circuit closure means by the sequence of phase voltages on its control and main electrodes.

4 Claims, 3 Drawing Figures

PATENTED AUG 1 1972 3,681,636

WITNESSES:
Bernard R. Gieguez
Leon M. Garman

INVENTOR
Wendell Calfee
BY Gordon H. Telfer
ATTORNEY

PHASE SEQUENCE SENSING CIRCUIT

BACKGROUND OF THE INVENTION

1. Field of the Invention

This invention relates to phase sequence sensing circuits applicable to AC power systems.

2. Description of the Prior Art

Phase sensing circuits are often used in electrical systems to provide operating protection for system components. Such sensing circuits are applied, for example, in aircraft and aerospace vehicles where three-phase, 400 hertz, power systems are commonly employed. In such applications weight, size and power dissipation have to be minimized and accuracy and reliability must be high.

Among prior art arrangements are those wherein RC networks are employed to add phase voltage vectors. Such systems, however, require relatively large RC components that are undesirable from a miniaturization standpoint. Also, such systems do not perform consistently to give incorrect sequence indication when a shorted phase occurs. Such systems will also show a correct phase sequence with open phases.

The recognized problems of prior systems employing RC networks for phase voltage vector addition have been attacked and to a large extent solved in U.S. Pat. No. 3,431,467, Mar. 4, 1969, by the present inventor. In accordance with that invention a semiconductor switch such as a thyristor (also sometimes called a controlled rectifier) is connected to the phase voltages to conduct only upon proper sequence or simultaneous presence of different phase voltages on its control electrode and one of its main electrodes. If the sequence is correct, a capacitor in the circuit of the other main electrode charges to a voltage level sufficient to operate a switching device used to connect a load to an energized system. If the sequence is incorrect, the capacitor does not charge sufficiently and the switching device is not energized.

Despite the utility of prior systems such as that in the above-mentioned patent it remains desirable to minimize the number of elements required in the circuit and avoid the additional requirement of a supply voltage separate from the phase voltages.

SUMMARY OF THE INVENTION

Among the objects of this invention are to provide a phase sequence sensing circuit in which the number of circuit elements are minimized and the circuit operates only on the phase voltages as its power source.

These and additional objects and advantages of the present invention are achieved through the provision of a circuit wherein a semiconductor switching means such as a thyristor (or controlled rectifier) is connected to the phase voltages for producing an output upon simultaneous presence of voltages on its control and one main electrode, with the output remaining on so long as the voltage is present on the one main electrode. Electrically responsive circuit closure means such as an electromechanical relay is coupled between that one main electrode and its phase voltage for closing, without any other required power supply, a load circuit only when the phase voltages have a predetermined relation as determined by the average voltage over a full cycle.

The invention is applicable to sensing the sequence between two or more phases. The voltage applied to the control electrode of the described semiconductor switching device may itself be developed from a previous pair of phases with a thyristor or the like producing a signal only upon correct phase sequence.

DESCRIPTION OF THE PREFERRED EMBODIMENTS

Figure 1:
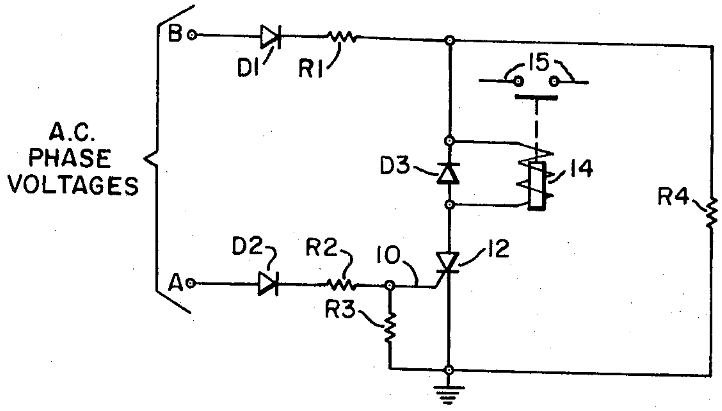
FIG. 1 is a circuit schematic of one embodiment of the present invention.

Referring to FIG. 1 there is shown a circuit for sequence sensing two phases of an AC polyphase system. Half wave rectifiers D1 and D2 are connected to conduct on positive half cycles of applied phase voltages B and A through respective current limiting resistors R1 and R2. Only two phases are required to obtain phase sequence sensing in the basic circuit shown in FIG. 1 which will sense all proper phase sequences, which are ABC, BCA, and CAB, in a three-phase system. It will not provide a signal for incorrect sequences which are ACB, CBA, and BAC.

Figure 3:
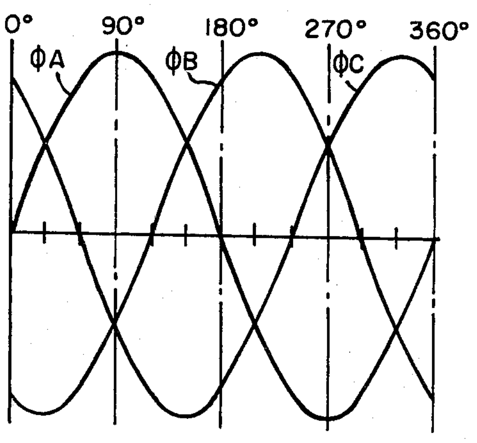
FIG. 3 is a set of waveforms useful in understanding the operation of the present invention.

A voltage representing the first phase voltage A is applied by conductor 10 to the control electrode of a semiconductor switching device 12 such as a thyristor or controlled rectifier. The control electrode (or gate) is clamped to ground through a resistor R3. FIG. 3 shows correct sequencing of three phases A, B, and C of sinusoidal voltage waveforms. When the phase B voltage starts its positive swing, which should be 120° after phase A started its positive swing, diode D1 conducts to the anode of the thyristor 12 through resistor R1 and the parallel combination of diode D3 and relay 14. As was the case in the circuit described in the aforementioned patent, the thyristor 12 provides a switch that turns on only when two phases are coincident on its control electrode and one of its main electrodes and yet will remain on so long as the phase voltage is present on the one of its main electrodes. In contrast to the previous patent this is not used for charging a capacitor but rather is directly employed to operate the electromechanical relay 14 and, upon correct sequencing, to energize some load circuit, represented by the lines 15. The average voltage is determined by the ratio of the parallel impedance of the relay coil 14 and resistor R4 to that of resistor R1 over a full cycle. The resistors R1 and R4 are used as a voltage divider (primarily to protect thyristor 12) and diode D3 is used to commutate the energy in the relay coil.

The operation is such that the ratio of the average voltages between a correct sequence and an incorrect one is four, as was the case in the prior capacitor charging circuit operation. The operating voltage of the relay is selected in order to determine the actual magnitude required for correct sequencing. The circuit of FIG. 1, in comparison with the prior art, provides advantages in the use of fewer parts and because the phase voltage is used as the power source for the circuit closing relay. The circuit of the previous patent remains highly useful, however, in that it does provide operation with only about half as much power dissipation as the present circuit and operates more compatibly with solid state logic.

Figure 2:
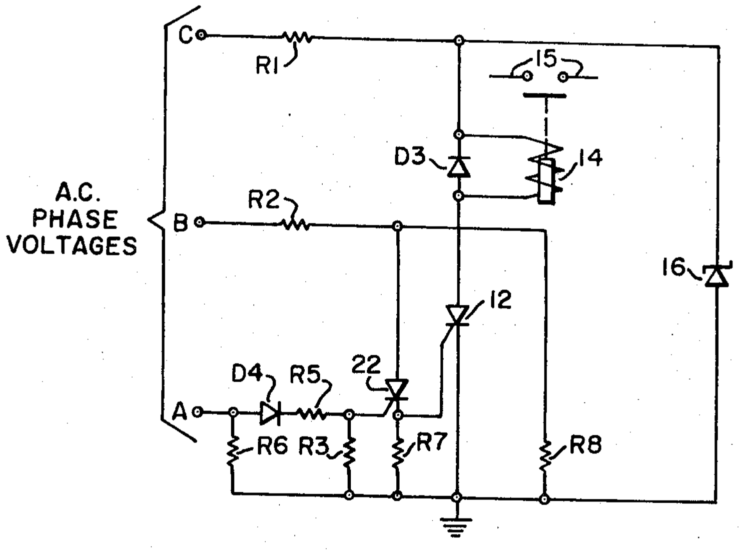
FIG. 2 is a circuit schematic of another embodiment of the present invention.

FIG. 2 shows a modification of the circuit of FIG. 1 which requires all three voltage phases to be present for phase sequence sensing. In the embodiment of FIG. 2, sequence sensing between each pair of phases AB and BC is provided by means essentially similar to that described in FIG. 1 for phases A and B. The signal to the gate of the thyristor 12 between phases BC represents a cumulative phase sequence signal of both prior phases A and B. The circuit configuration for sensing the sequence of phases B and C in FIG. 2 corresponds essentially to that for phases A and B of FIG. 1. The voltage of phase A is used to provide a gate signal to a controlled rectifier or thyristor 22 through diode D4 and resistor R5. The anode of the thyristor 22 is connected through a voltage dropping resistor R2 to phase B and its cathode is connected to the gate of a second thyristor 12. Thyristor 12 has its anode connected through a relay coil 14 to phase C and its cathode connected to ground or neutral.

The circuit relies on phase A to provide a gate signal to thyristor 22 for 180°, which is for 60° after the voltage of phase B becomes positive. When the voltage of phase B becomes positive, thyristor 22 conducts current from anode to cathode and it remains conducting for 180°, or as long as phase B is positive, even though its gate signal is removed when the voltage of phase A goes negative. The anode to cathode current of the thyristor 22 provides the gate signal to the second thyristor 12. When phase C becomes positive, the second thyristor 12 starts conducting as the signal remains on the gate of thyristor 12 for 60° after phase C becomes positive. This is a repeating function and results in a single phase, half wave current through the relay coil 14 which energizes it to indicate a correct phase sequence and close circuit 15.

Should two phases be interchanged, such as phases B and C, an incorrect sequence of ACB results. Now thyristor 22 conducts for 60° after the voltage of phase A becomes positive, as the anode voltage, now provided by phase C, goes negative 60° after the voltage of phase A becomes positive. Now the gate signal to thyristor 12 is for only 60° and occurs when the voltage of phase B, which now provides thyristor 12 with anode voltage, is negative. Thus no current is supplied through the relay coil.

Should any phase voltage be disconnected, a correct indication cannot be obtained. This is true because the phase A voltage is used to provide the gate signal to thyristor 22. The voltage of phase B is required to develop the gate signal to thyristor 12 and the voltage of the phase C is used to provide the power to energize the relay.

If desired the operation may be such that an output signal is produced only upon an incorrect phase sequence rather than upon a correct one. This merely requires that the indicated phases be connected in an incorrect order ACB.

The circuit can be used to sense phase sequence of either a three-phase, four wire system with the fourth wire grounded or a three-phase, three wire system. In a three-phase, four wire system, resistor R6 can be deleted and the cathode of thyristor 12 connected to ground. In a three-phase, three wire system, resistor R6 is used to help balance the impedance in each phase so the voltage summed at thyristor 12 cathode connection is approximately zero with respect to an external neutral or ground.

Resistor R6 is used for phase impedance balance in a three wire system as just described. Diode D4 is used to rectify the phase A voltage, as only the positive portion of the voltage wave is used. It is not necessary that diodes be provided in the lines to phases B and C. Resistors R3 and R5 make up a voltage divider network to control the amount of gate signal to thyristor 22. In addition, resistor R3 is used as a gate to cathode clamp for the thyristor 22 when the phase A voltage is negative. Resistor R7 is used both as a gate to cathode clamp for thyristor 12 when there is no gate signal and as a signal attenuator when there is one. The signal attenuation is necessary so that thyristor 12 will be gated by the conduction of thyristor 22 and not be the gate signal of thyristor 22. Resistors R2 and R8 make up a voltage divider network to limit the anode to neutral, or ground, voltage of thyristor 22 when it is not conducting. Also, resistor R2 is used to limit the current through thyristor 22 when it is conducting. Resistor R1 is a current limiting device for both relay 14 and thyristor 12 when thyristor 12 is conducting and it works with Zener diode 16 to limit the anode to cathode voltage of thyristor 12 when the latter is non-conducting. Diode D3 is used as a commutating diode. The commutating diode D3 prevents a spike voltage buildup when thyristor 12 turns off and causes the energy which has been stored in the relay coil 14 during the conducting time of thyristor 12 to be dissipated during the non-conducting time.

Following is a table presenting typical component values and designations of a circuit like that of FIG. 2 as has been made and successfully operated:

| | |
|---|---|
| Thyristors 12 and 22 | GE C106B4 |
| Diode D3 | 1N914 |
| Diode D4 | 1N649 |
| Zener diode 16 | 68 v. |
| Resistor R1 | 20 k. ohms |
| Resistor R2 | 18 k. ohms |
| Resistor R3 | 56 k. ohms |
| Resistor R5 | 560 k. ohms |
| Resistor R6 | 24 k. ohms |
| Resistor R7 | 560 ohms |
| Resistor R8 | 10 k. ohms |
| Relay 14 coil | 2.5 k. ohms |

While the present invention has been shown and described in a few forms only, it will be apparent that various modifications may be made without departing from the spirit and scope thereof.

What is claimed is:

1. A circuit for sensing phase sequence of voltages in an AC polyphase system comprising: a first semiconductor switching means having a control electrode and a pair of main electrodes; means for applying a first voltage representing at least a first phase voltage to said control electrode; means for applying a second voltage representing an additional phase voltage to one of said main electrodes while the other of said main electrodes is maintained at a fixed reference potential, said switching means turning on and becoming conducting only when said first and second voltages are present and of the same polarity in relation to said fixed reference potential and remaining on during the time said second voltage is present; electrically responsive circuit closure means coupled between said one main electrode and said additional phase voltage for closing a load circuit only when said phase voltages have a predetermined relation.

2. The subject matter of claim 1 wherein: said means for applying a first voltage is coupled to a voltage representing only a first phase voltage and said first voltage is a rectified voltage applied for a full half cycle of the corresponding phase voltage to said control electrode.

3. The subject matter of claim 1 wherein: said means for applying a first voltage is coupled to a plurality of phase voltages which said first voltage represents.

4. The subject matter of claim 3 further comprising: a second semiconductor switching means having a control electrode and a pair of main electrodes; means for applying a voltage representing a first phase voltage to said control electrode of said second semiconductor switching means; means for applying a voltage representing a second phase voltage to one of said main electrodes of said second semiconductor switching means; said second semiconductor switching means turning on and becoming conductive only when said voltages are both present and remaining on during the time said voltage is present on said one of said main electrodes; said means for applying a first voltage to said control electrode of said first semiconductor switching device is coupled to the other of said main electrodes of said second semiconductor switching means.

* * * * *